2 Sheets--Sheet 2.

L. MILLER.

Improvement in Harvester-Rakes.

No. 127,181. Patented May 28, 1872.

Witnesses.
D. P. Cowl
Edmund Masson

Inventor:
Lewis Miller.
By atty A.B. Stoughton.

UNITED STATES PATENT OFFICE.

LEWIS MILLER, OF AKRON, OHIO.

IMPROVEMENT IN HARVESTER-RAKES.

Specification forming part of Letters Patent No. 127,181, dated May 28, 1872.

*To all whom it may concern:*

Be it known that I, LEWIS MILLER, of Akron, in the county of Summit and State of Ohio, have invented certain new and useful Improvements in Harvesting-Machines; and I do hereby declare the following to be a full, clear, and exact description of the same, reference being had to the accompanying drawing making a part of this specification, in which—

Figure 1:
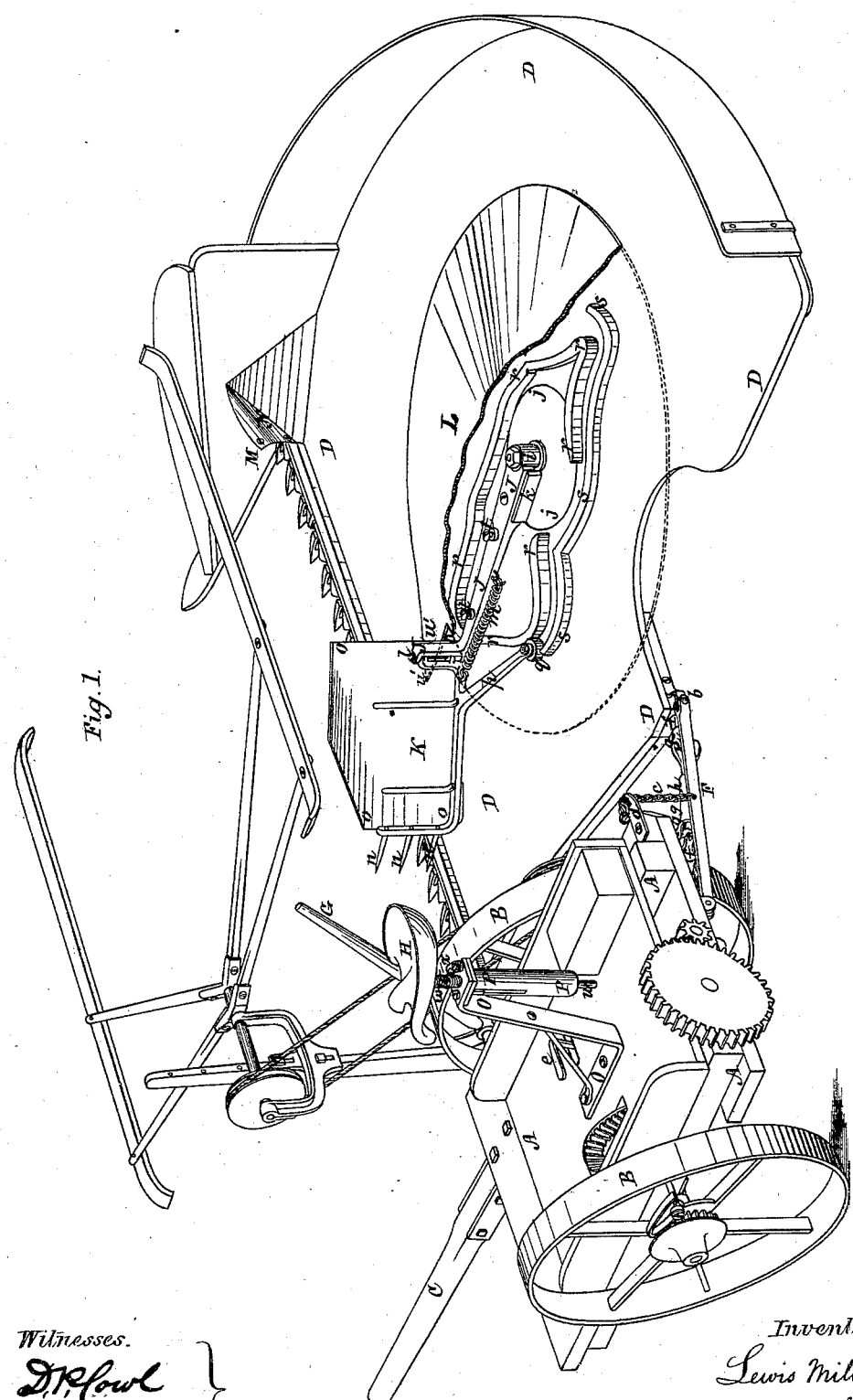
Figure 2:
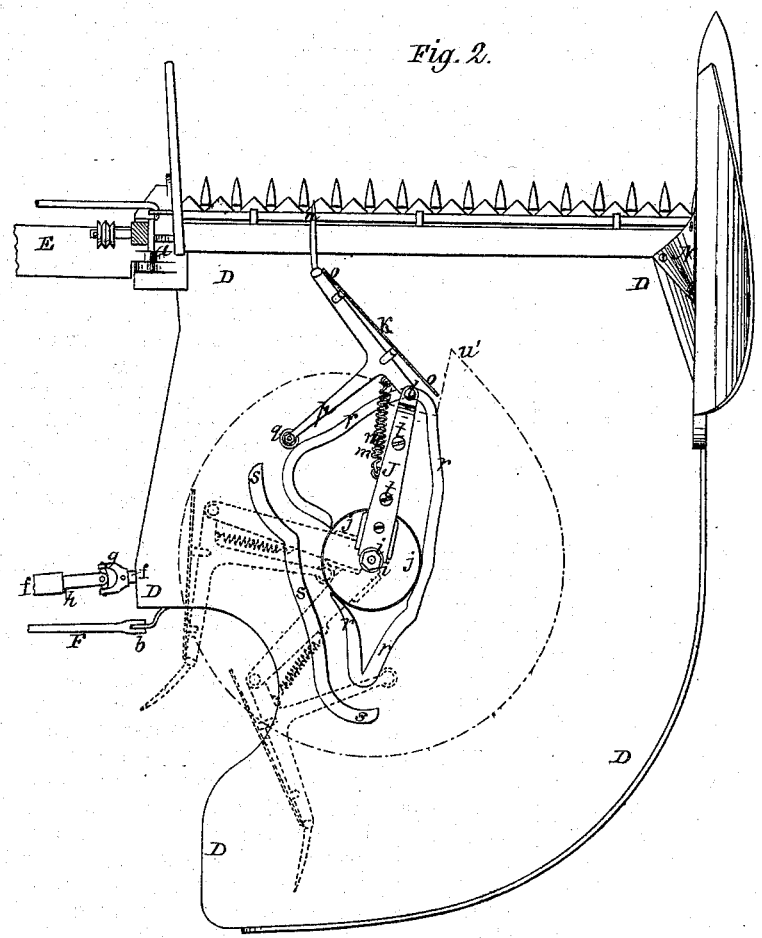

Figure 1 represents a perspective view of the machine with a portion of the shield covering the rake mechanism broken away to show the parts underneath it. Fig. 2 represents a top plan of the grain table or platform, with the rake and its mechanism, in one of its positions in full lines and in two other positions by dotted lines.

Similar letters of reference, where they occur in the separate figures, denote like parts of the machine in the drawing.

This invention relates more particularly to the construction and operation of a rake and its mechanism, located and actuated on the platform or grain-table of the machine, and so as to sweep the grain first from the main frame toward the grain side of the platform, and thence around to a delivery point toward the rear of the platform and on that side of it next the main frame.

To enable others skilled in the art to make and use my invention, I will proceed to describe the same with reference to the drawing.

The main frame A is carried on the supporting and driving wheels B B in the usual well-known way. On the main axle and on the main frame are arranged the gears for driving the cutting apparatus, as also the reel, portions of which are seen, and all sufficiently understood without a detailed description. C is the pole, to which the team is hitched and the machine guided over the field. The platform or grain-table D is hinged at *a b* to front and rear coupling-arms E F, which coupling-arms, in turn, are hinged at their inner ends to the main frame or bearings thereon, so that the platform or grain-table and the reel, cutting and raking apparatus, and mechanism that operate them, may have a rising and falling or yielding motion independent of the main frame. The front of the platform can be raised, lowered, or held at any suitable height by means of a lever, G, within reach of the driver in his seat H, said lever being furnished with a segment, chain, and teeth in the well-known way; and the rear of the platform can be adjusted and held at suitable height by means of a chain, *c*, attached to the rear coupling-arm F, the links of which are caught and held in a slotted arm, *d*, attached to and projecting from the main frame. The platform, being suspended by flexible chains, cannot drop below a certain line, but is free to rise above that plane when any occasion should require it. A clutch-lever, *e*, projects through the platform, so that the driven parts may be thrown out of or into action, at pleasure. A shaft, *f*, which is rotated by means of a bevel-gear on the main axle working into a bevel-pinion on said shaft *f*, and which shaft is furnished with a universal joint, as at *g*, and with a slip-joint or connection at *h*, extends from underneath the main frame to a point under the platform or grain-table D about central of said platform, where it is supported and shielded, and at its extreme outer end, or nearly so, it carries a bevel-pinion that gears into and turns a wheel, *j*, that is supported on a journal-pin that is secured to a bridge-plate underneath the platform, and projects up above the same sufficiently far to receive the hub *i* of said wheel *j* and to hold a nut on top of said hub to keep the wheel in place. To this wheel *j*, by means of an interposed shoe, *k*, the rake-arm J is fastened so as to turn with said wheel, and around the center of motion entirely on the platform, and in rear of the cutting apparatus. To the forward or free end of the rake-arm J is pivoted, as at *l*, a fork or rake, K, which is connected to the rake-arm J by a coiled spring, *m*, that extends past the pivotal connection to keep the rake in proper position, as will be hereafter explained. The rake K is composed of the teeth *n*, shield or palm *o*, elbow-lever *p*, and friction-roll *q* in the rear end of said lever. Around the wheel *j*, in an irregular path or line, is arranged a camway or guide, *r*, against which the friction-roll *q* in the rear end of the lever *p* runs, and is held by the action of the spring *m*. Toward the main-frame side of the platform, and just outside of the cam-way or guide *r*, is another piece or section of guide-way, *s*, which is intended to protect the rake from being thrown accidentally or by any sudden jar against the main wheel D as it is passing by. The cam-way or guide $r$ is arranged with much care, so as to give the rake, in the course of its transit around the platform, several functional movements, which will be hereafter explained and set forth in connection with the operation of the machine. Over the rake-arm J and the cam-ways or guides $r$ $s$ is placed a table, L, which may be fastened to the rake-arm J by the screws $t$ $t$ so as to revolve with said rake-arm. The revolving table L is mainly circular, one portion only—viz., that at $u'$—being eccentric, and projecting beyond a circular line so as to form a recess for the palm and rear of the rake to extend into and be protected by. This revolving table L is designed to protect the rake-arm and cam-ways from being clogged by the falling grain, and the table itself revolves with the rake so as to carry any straws that might otherwise tend to wind or clog the rake. Where the outer end of the cutting apparatus meets or passes the outer grain-board M there is arranged an angle-board, N, which inclines backward and outward to prevent the grain from lodging on it as it is cut and falls thereon. This angle-board crowds the grain out of the extreme corner or point of cutting, and holds it in a position to aid the fork or rake in gathering it into the gavel, and thus clears the corner of the platform.

A spring-seat of peculiar construction is shown in Fig. 1; but, as it forms no part of the present application, further description is unnecessary. This feature will form the subject of another application.

The rake herein described, though simple in its construction and operation, accomplishes many desirable results, as I shall proceed to state. It moves the grain first toward the grain side of the machine, and then in a circular movement to the place of delivery, where it is thrown off by an arrangement of mechanism placed entirely upon the platform and in rear of the cutting apparatus. It carries with it a revolving shield or table, upon which the grain falls, and thereby prevents all possibility of the grain becoming entangled with the gearing, rake-arm, or rake.

In entering the grain to remove the gavel the palm or part $o$ first moves the grain, and then the fork $n$ comes into action, reaching forward and passing along the finger-bar in a line parallel to said bar, or nearly so; and when the gavel is delivered the points of the fingers or forks $n$ point backward so as to leave or be withdrawn from the gavel without disturbing it. This position and action of the rake is shown in dotted lines in Fig. 2. The spring $m$, which is connected to the rake and rake-arm, holds the lever $p$ or its roller to the cam-way that regulates the outward thrust of the rake, so that the rake is always moving with a defined positive motion. The sectional guide-way $s$, where there is any liability of the rake being injured, is a sufficient protection against such liability.

That the rake or fork may take all the grain from the platform, there is a raised portion along in rear of the cutters, upon which the butts of the cut grain drop and rest, and the rake or fork moving below and in rear of this raised portion takes all the grain lying upon the platform.

What I have termed the palm $o$ also acts as a compressing-board; and, as the highest portion of this board is in advance of the fork as it moves along the finger-bar, it prevents any part of the gavel from crowding up onto the arm or rake, which would cause "trailing or dragging" and make imperfect gavels. This compressing-board follows and extends below the shield or revolving table, and thus prevents any grain from gathering under the arm of the rake as it moves around to take and deliver the gavel.

When the fork or rake enters the grain in the space between the driving-wheel and the falling grain it does so with the fingers or tines of the fork or rake pointing backward and toward the driving-wheel, so as to prevent the fork from crowding the grain forward as it enters to remove the gavel. This position of the rake and its fingers preparatory to its sweeping off the gavel is shown in dotted lines in Fig. 2.

Having thus fully described my invention, what I claim therein as new, and desire to secure by Letters Patent, is—

1. In combination with a rake-arm that is moved around a center of motion on a central part of the platform and in rear of the cutters, and a cam-way around said center of motion, a rake or fork pivoted to the outer end of said arm, and tied to said arm by a retracting spring passing or crossing the pivotal connection, said rake or fork having an elbow or bell-crank lever, with a friction-roll to run against the cam-way to give the fork its outward thrust, while the retracting spring keeps it always to the cam-way, substantially as and for the purpose described.

2. I also claim, in combination with a rake-arm and fork or rake moving around a center of motion on the platform, and the fork or rake moved on said arm, a shield or table that revolves with said arm and rake to protect them from being clogged by the grain, substantially as described.

3. I also claim, in combination with a revolving rake-arm, rake or fork, and shield or table, the projection $u'$ on said shield, behind and under which the palm or compressing-board $o$ of the fork moves so as to prevent any grain from entangling on the rake or rake-arm, substantially as described.

4. I also claim the herein-described arrangement of the rake-arm, the pivoted fork or rake, the elbow-lever, and cam-way, by which, when the gavel is swept clear around to the point of delivery, (which is in rear of the platform and between its rear portion and the rear of the main frame,) the fingers or tines of said fork or rake shall point backward, and the continued motion of said fork shall slip or draw the fingers or tines out of the gavel without disturbing its compactness, substantially as described.

LEWIS MILLER.

Witnesses:
W. B. DOYLE,
G. W. GLINES.